Sept. 16, 1924.

J. W. PATTERSON

BALL

Filed March 22, 1920

1,509,025

Inventor:
John W. Patterson,
by Emery, Booth, Janney & Varney
Attys.

Patented Sept. 16, 1924.

1,509,025

UNITED STATES PATENT OFFICE.

JOHN W. PATTERSON, OF NEW HAVEN, CONNECTICUT, ASSIGNOR TO THE SEAMLESS RUBBER COMPANY, INC., OF NEW HAVEN, CONNECTICUT, A CORPORATION OF MASSACHUSETTS.

BALL.

Application filed March 22, 1920. Serial No. 367,729.

*To all whom it may concern:*

Be it known that I, JOHN W. PATTERSON, a citizen of the United States, and a resident of New Haven, county of New Haven and State of Connecticut, have invented an Improvement in Balls, of which the following description, in connection with the accompanying drawings, is a specification, like characters on the drawings representing like parts.

This invention relates to hollow balls and while not limited thereto finds particular application to tennis balls and especially to so-called unstitched tennis balls which are covered by sections of felt which are cemented thereto but which are not sewn together along their edges.

The principles underlying my invention may be readily understood from the following description of an example thereof illustrated in the accompanying drawings, wherein.

As an example of my invention I have herein shown an unstitched tennis ball embodying a hollow inflated center 3 covered by separate sections of felt 5 and 7 suitably cemented thereto but in the present instance, since an unstitched ball is shown, not sewn together along the meeting edges 9 of the sections.

Figure 2:
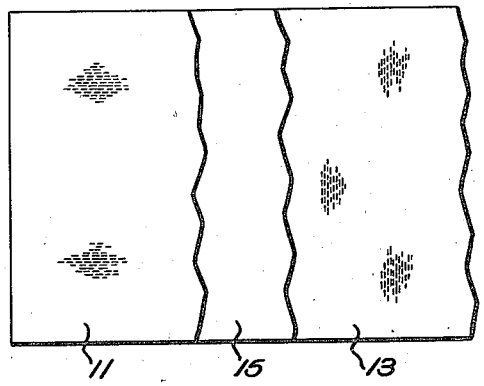
Fig. 2 is a progressively broken plan of the material used in making the same.

The ball center 3 may be constructed in accordance with any suitable known method, conveniently by vulcanizing together lune shaped sections. Such sections may be cut from a suitable sheet of stock of which the preferred form is illustrated in Fig. 2. I have there shown a sheet of stock comprising two thicknesses 11 and 13 of rubber composition which may be similar to that at present commonly utilized for ball centers, being loaded in a manner well known in the art with zinc oxide, magnesia or the like to make it sufficiently hard and tough. Sheets of rubber have a certain grain due to their passage through the calenders and I have herein indicated by shading that the grain of the layer 13 is placed transversely of the grain of the layer 11 so that the two cross. The two sheets 11 and 13 are united by a thin layer of pure black gum or gum rubber 15 without loading material of any kind. The thickness of the composite sheet may be substantially the same as the thickness of the stock usually employed for similar ball centers.

Figure 1:
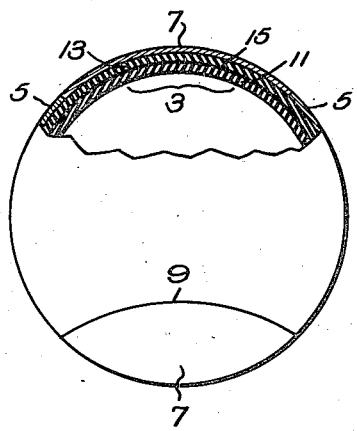
Fig. 1 is a partly broken elevation of a ball.

As shown in Fig. 1 the ball center 3 constructed from stock of this nature is a laminated structure comprising inner and outer layers of rubber composition with an intermediate layer of pure black gum. The ball center 3 is suitably inflated in the case of the tennis ball and the crossing of the grain in the two layers in itself minimizes leaks due to porosity of the rubber and the intermediate film 15 of gum acts effectually to stop such leakages.

The structure also provides a ball more durable and less likely to break in use. As these qualities of durability are most apparent at the joining line 9 it will conduce to brevity to refer to them as they are made manifest at that point. In the case of an unstitched tennis ball more particularly, the center is subject to bending strains along the line where the sections join. Elsewhere it is supported and the strains are distributed by the covering material and in the case of a stitched ball the stitches form a brace between the sections. In the unstitched ball, however, the joining line 9 of the sections forms a sort of hinge and it is found that balls will fail by splitting at this line. A laminated center as here shown is obviously of greater flexibility than one made in a single piece and particularly this is true in the present instance because the layers 11 and 13 can move more or less independently one of another due to their being joined by the highly yielding film of pure rubber 15. The presence of this highly flexible layer of material provides a hinging action at the joint 9 which prevents the center from breaking. Furthermore, when two permanently united layers with crossed grain are used the ball is not likely to split because a tear cannot start and continue through the two layers because a split tending to follow the grain of one will be across the grain of the other so that while a local break may occur the ball cannot be readily ripped open as in the case of a center formed of a single layer of material.

The use of two layers with crossed grain equalizes the resistance to inflating pressure in such manner that the ball center when inflated is perfectly round. Centers made of a single thickness of rubber have greater resistance in one direction than the other. This may be noted if such a ball is inflated excessively until it bursts. Before the bursting the ball assumes an oblong shape readily visible to the eye and this defect is, of course, present in less degree at lower pressures. On the other hand the ball center constructed of a plurality of thicknesses with the grain crossed is perfectly round.

In constructing tennis balls the centers are usually given a preliminary inflation during vulcanization by means of ammonium carbonate which is decomposed by the heat of vulcanization and inflates the cured center. A decomposition product is ammonia which is retained within the ball center and has a deteriorating effect on the same in the course of time. In the present example of the invention the layer 15 of gum proofs the center and protects the layer 13 from the ammonia which cannot eat through and destroy the integrity of the ball as a whole.

Having thus described in detail the particular form of my invention shown by way of example in the accompanying drawings, the principles exemplified thereby which I claim as new and desire to secure by Letters Patent I shall express in the following claims.

Claims:

1. A hollow ball having a wall comprising two layers of tough rubber composition and an intermediate layer of soft substantially sulphur-free gum rubber.

2. A hollow ball having a wall comprising two layers of tough rubber composition with the grain thereof relatively crossed and an intermediate layer of soft substantially sulphur-free gum rubber.

3. An unstitched tennis ball comprising a center having unjoined covering sections secured thereto, said center comprising two layers of tough rubber composition and an intermediate layer of soft substantially sulphur-free gum rubber.

4. An unstitched tennis ball comprising a center having unjoined covering sections secured thereto, said center comprising two layers of tough rubber composition with the grain thereof relatively crossed and an intermediate layer of soft substantially sulphur-free gum rubber.

5. An inflated ball having a wall comprising a thickness of tough rubber composition proofed with a layer of pure substantially sulphur-free gum rubber.

In testimony whereof I have signed my name to this specification.

JOHN W. PATTERSON.